United States Patent [19]

Ueda et al.

[11] 4,240,733
[45] Dec. 23, 1980

[54] MOTOR DRIVEN CAMERA HAVING A DETACHABLE DRIVE UNIT

[75] Inventors: Hiroshi Ueda, Nara; Takayoshi Miyamoto; Masatake Niwa, both of Sakai, all of Japan

[73] Assignee: Minolta Camera Kabushiki Kaisha, Osaka, Japan

[21] Appl. No.: 948,768

[22] Filed: Oct. 3, 1978

[30] Foreign Application Priority Data

Oct. 5, 1977 [JP] Japan ............................ 52/118994
Nov. 29, 1977 [JP] Japan ............................ 52/142251

[51] Int. Cl.³ .................................................. G03B 1/12
[52] U.S. Cl. ................................................... 354/173
[58] Field of Search ............................. 354/171, 173

[56] References Cited

U.S. PATENT DOCUMENTS

| | | | |
|---|---|---|---|
| 3,640,201 | 2/1972 | Kimura | 354/173 |
| 3,852,779 | 12/1974 | Yamamichi et al. | 354/51 |
| 3,903,534 | 9/1975 | Ito | 354/173 |
| 3,994,003 | 11/1976 | Iwashita et al. | 354/173 |

*Primary Examiner*—John Gonzales

*Attorney, Agent, or Firm*—Watson, Cole, Grindle & Watson

[57] ABSTRACT

A motor driven camera has a detachable drive unit, and includes a motor drive circuit which is activated for driving a film wind-up and shutter charge motor on receipt of a signal representative of termination of an exposure. The camera also includes a selector capable of being set at a single frame photographing position as well as at a continuous photographing position, and a control mechanism for preventing generation of the signal with the selector set at the single frame photographing position. A signal generating device is associated with a film wind-up stop mechanism for generating the signal when the stop mechanism is disengaged from a film wind-up and shutter charge mechanism in response to termination of an exposure, disengagement of the stop mechanism being prevented or the signal generating device being deactivated by the control mechanism when the selector is set at its single frame photographing position. The control mechanism is disabled to permit the generation of the signal when a shutter release member is returned from its operative position to its non-operative position.

19 Claims, 18 Drawing Figures

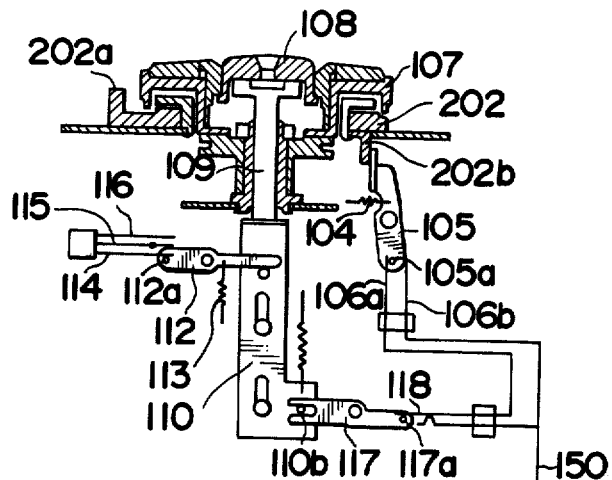
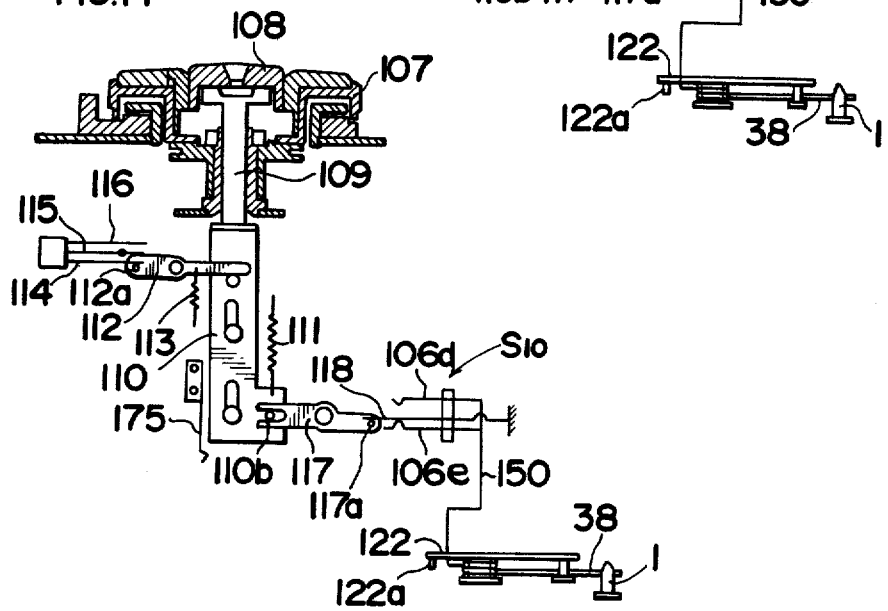

MOTOR DRIVEN CAMERA HAVING A DETACHABLE DRIVE UNIT

BACKGROUND OF THE INVENTION

This invention relates generally to a motor driven camera having a detachable drive unit which includes a motor drive circuit capable of being activated for driving a film wind-up and shutter charge motor upon receipt of an electrical signal representative of termination of a camera exposure.

One type of known motor driven camera having a detachable drive unit makes provision for transmission of a signal upon termination of an exposure to the drive unit for commencing the driving of a film wind-up and shutter charge motor thereof. Another type of such motor driven camera having a detachable drive unit makes provision for starting the drive of a film wind-up and shutter charge motor after a predetermined lapse of time from each shutter release without receiving any signal from the camera. The drive units used for such cameras of both types incorporate a release circuit triggered by a release member on the sides of the drive units so as to issue a shutter release signal which should be transmitted to the cameras from the drive units.

Therefore, the motor driven camera of the first-mentioned type requires at least two signal transmitting connections between the camera and the drive unit. In addition, if the camera is provided with a selector for effecting either a single frame photographing mode or a continuous photographing mode, a larger number of signal transmitting connections are required for transmitting the photographing modes selection signal to the release circuit and the drive unit. However, an increase in the number of signal transmitting connections results in a more complex camera construction and drive unit connecting mechanism, and requires accuracy in positioning the signal transmitting connections. Thus, it has been customary in cameras of the first-mentioned type to provide the selector on the side of the drive unit so that signal transmission of the photographing modes selection signal would not be necessary.

On the other hand, in the motor driven camera of the second-mentioned type, the shutter should always be controlled at shutter speeds which are shorter than the predetermined lapse of time during the continuous photographing mode because a film wind-up and shutter charge should not be carried out during exposure. This results in a restriction of the shutter speed setting, or renders automatic shutter speed control under dark scene brightness conditions impossible. In addition, if the camera is provided with a selector for effecting either a single frame photograhing mode or a continuous photographing mode, an additional signal transmitting connection is required for transmission of the photographic modes selection signal in the same manner and for the same reason as discussed for the camera of the first-mentioned type.

SUMMARY OF THE INVENTION

It is an object of the present invention to provide a motor driven camera having a detachable drive unit, wherein all manual operations required for motor drive photographing can be carried out on a side of the camera so that the camera is made easy to operate.

Another object of this invention is to provide such a motor driven camera which is capable of being selectively set for either single frame photograhing or for continuous photographing, but which requires no signal transmitting connections other than that needed for transmitting a signal to actuate a motor drive circuit in the drive unit from the camera to such drive unit.

A further object of the present invention is to provide such a motor driven camera wherein shutter speed setting or automatic shutter speed control is not restricted.

In carrying out these objectives, the motor driven camera of the present invention includes a manual release member, shutter release means for releasing the shutter to produce an exposure in response to actuation of the release member, a manual selector capable of being selectively set for effecting either a single frame photographing mode or a continuous photographing mode, means for generating a signal upon termination of the exposure for actuating a motor drive circuit of a detachable drive unit, and a control mechanism coupled with the selector for disabling or deactivating the signal generating means when the selector is set at its single frame photographing position.

With such construction, shutter release is carried out each time a shutter charge as well as a film wind-up is effected by means of the motor if the release member is actuated. Thus, no signal transmitting connection for transmitting a shutter release signal from the drive unit to the camera is required. In addition, since the selector and the control mechanism are provided on the camera, no signal transmitting connection for effecting either the single frame photographing mode or the continuous photographing mode is required. Therefore, the camera according to the invention requires only one signal transmitting connection which serves to transmit the signal representative of termination of the exposure from the camera to the drive unit. The camera and drive unit connecting mechanism is therefore rendered simple in its construction. Moreover, in the camera according to the invention, film wind-up and shutter charge cannot be effected until the generation of the signal, so that a given setting of shutter speed or of automatic shutter speed control is made possible even during continuous photographing.

Other objects, advantages and novel features of the invention will become more apparent from the following detailed description of the invention when taken in conjunction with the accompanying drawings.

BRIEF DESCRIPTION OF THE DRAWINGS

FIG. 13 is a front elevational view, partly in section, of a shutter release mechanism and a photographing modes selecting mechanism of the camera according to a fifth embodiment of the invention;

FIG. 14 is a front elevational view of a shutter release mechanism and a photographing modes selecting mechanism of the camera according to a sixth embodiment of the invention;

DETAILED DESCRIPTION OF THE INVENTION

Figure 1:
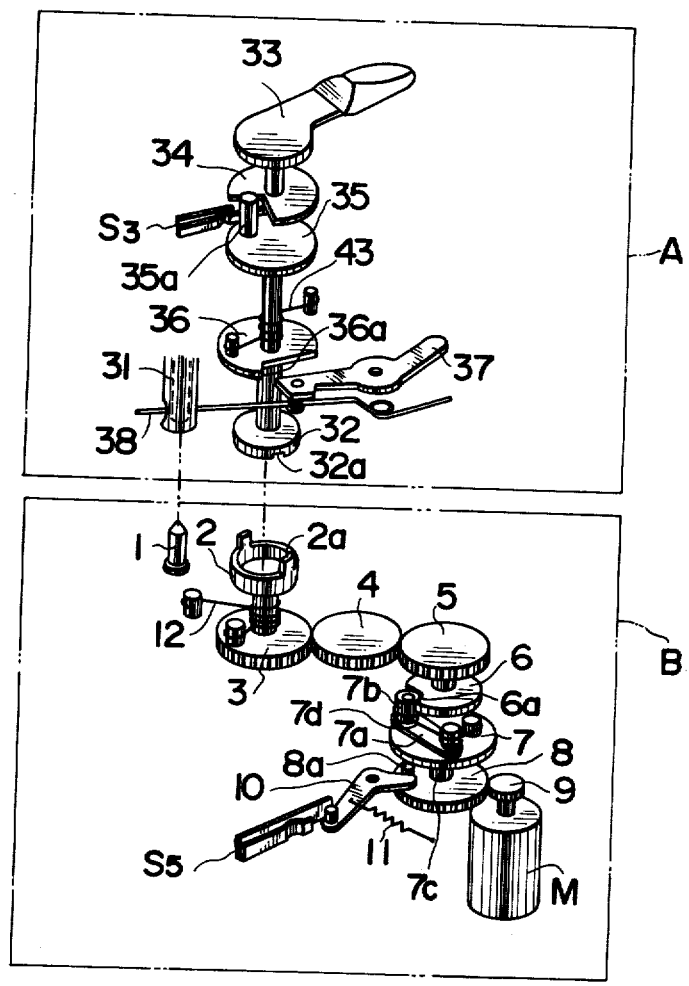
FIG. 1 is a perspective view of a film wind-up mechanism of a camera and a drive unit according to a first embodiment of the invention.

One embodiment of the present invention is shown in FIGS. 1 through 5. The essential parts of a film wind-up and shutter charge mechanism of a motor driven camera A are shown in FIG. 1 together with a motor drive transmission system of a detachable drive unit B. A positioning pin 1 of the drive unit is fitted into a positioning opening 31 of motor driven camera A for positioning drive unit B and camera A when mounted in place in any normal manner.

Drive unit B has a drive motor M, a gear 8 engaging a drive gear 9 of the motor, a pin 8a on gear 8, a roller support plate 7 mounted for rotation together with gear 8, and a roller 7b rotatably mounted on a roller holder 7a which is pivotally mounted on a shaft 7c of plate 7 and which is biased by a spring 7d into clockwise rotation. A drive transmission cam 6, having a cutout portion 6a with which roller 7b is frictionally engageable, comprises a clutch means together with roller 7b. Drive transmission cam 6 is fixedly and co-axially connected to a gear 5. A gear 4 interengages with gear 5, and gear 3 interengages with gear 4. A coupling element 2 is fixedly mounted axially on gear 3 and has a projection 2a, a return spring 12 being wound about the shaft interconnecting gear 3 and element 2.

A switch actuation lever 10 of drive unit B is biased by a spring 11 into counter-clockwise rotation, and one end of this lever releasably engages pin 8a of gear 8. The other end of lever 10 is in contact with a normally closed switch $S_5$ (described in more detail hereinafter and shown in FIG. 5) in such a manner as to push switch $S_5$ into an open position upon clockwise rotation of actuation lever 10.

A disc 34 having a cutout portion at its periphery is co-axially fixed to a shaft of a wind-up lever 33 of motor driven camera A upon which drive unit B is mounted by means of a tripod screw (not shown) when positioning pin 1 is fitted into positioning opening 31. A wind-up member 35 is co-axially mounted on another shaft and has a pin 35a for closing a normally open switch $S_3$ (to be later described in more detail), a wind-up cam 36 also being mounted on this other shaft and having a cutout portion 36a releasably engageable with a stop lever 37 (to be later described in more detail). Lever 37 is biased by a return spring 38 for counter clockwise rotation as viewed in FIG. 1, and a coupling element 32 having a recess 32a releasably engageable with projection 2a of coupling element 2 on driven unit B, is likewise mounted on this other shaft.

Figure 2:
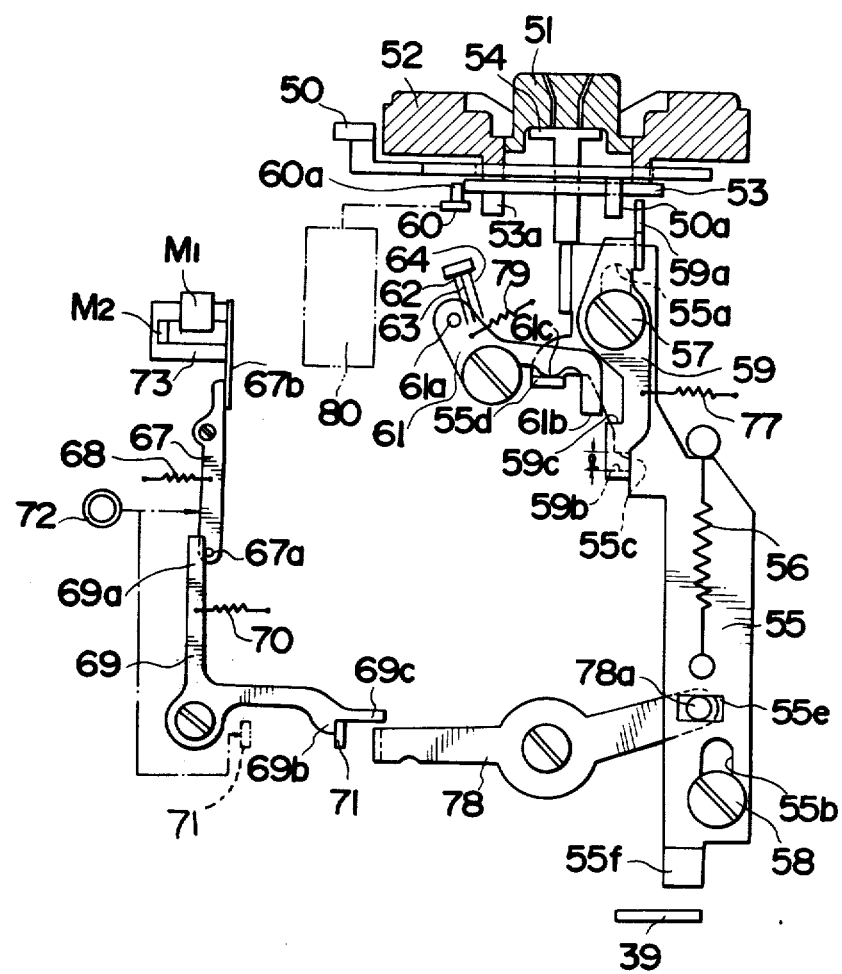
FIG. 2 is a front elevational view of a shutter release mechanism and a photographing modes selecting mechanism of a first embodiment.

Referring to FIG. 2, which shows the essential part of a shutter release device, a single frame photographing and continuous photographing selector 50 is mounted co-axially relative to a shutter speed setting dial 52 designed for selection of an electrical automatic control mode, an electrical manual setting mode or a mechanical control mode for the shutter speed controls. Selector 50 can therefore be moved to selectively set the respective photograhing positions. A pin 50a is mounted on selector 50 and is releasably engageable with a bent portion 59a of a stroke selector 59 (to be later described in more detail).

A cam 53 is mounted on dial 52 for rotation therewith, and a release shaft 54, axially movable by a shutter button 51, loosely disposed in a central bore of dial 52, is in contacting engagement with an upper end of a release plate 55. Shaft 54 extends through selector 50 and through cam 53.

Release plate 55 has vertically extending elongated slots 55a and 55b and is guided for vertical movement by means of pins 57 and 58 extending through these elongated slots. The release plate is biased upwardly by a spring 56 having one end mounted on the camera and its other end mounted on the plate, and an end piece 55f is located at the lower end of release plate 55. This end plate is releasably engageable with an auxiliary stop lever 39 which will be later described in more detail. The release plate is also provided with an opening 55e engaged by a pin 78a of a mechanical release lever 78 which is pivotally mounted at its center on camera A. An extension 69c of an L-shaped stop lever 69 is engageable with the free end of lever 78 during clockwise rotation of lever 78 so that lever 69 is rotated counterclockwise against the force of its spring 70, and a jaw portion 69b of lever 69 is engageable with a known reflecting mirror or a diaphragm drive lever 71 which is movable between a phantom outline position and a solid outline position, as shown in FIG. 2. An electromagnetic release lever 67 is mounted on the camera and is biased by a spring 68 for clockwise rotation, and has a pin 67a engageable with an arm 69a of stop lever 69. An armature 67b extends outwardly of the other end of lever 67 and is actuated by an electromagnet $M_1$ and by a permanent magnet $M_2$, both of which will be later described in more detail. Armature 67b is normally attracted by a permanent magnet $M_2$ against the force of spring 68 to the yoke of electromagnet $M_1$, and the attraction of armature 67b is released by the force of spring 68 when electromagnet $M_1$ is energized.

A return member 72 is movable to the right in the direction of the arrow of FIG. 2 and, during such movement, member 72 engages release lever 67 so as to rotate it counter-clockwise against the force of spring 68 thus causing armature 67b to abut against the yoke of electromagnet $M_1$. At the same time the mirror for the diaphragm drive lever 71 is caused to be pushed to move from its phantom outline position (at which the mirror is rotated to a photographing position and the diaphragm is stopped-down) to its solid outline position (at which the mirror is rotated to an image viewing position and the diaphragm is fully open).

As shown in FIG. 2, stroke selector 59 is mounted for pivotal movement about pin 57, is biased by a spring 77 for counter-clockwise rotation and is releasably engageable through its bent portion 59a with pin 50a of selector 50 as described earlier. When release plate 55 is in its uppermost lifted position of FIG. 2, a bent portion 59b of stroke selector 59 is spaced a distance 1 from a cutout portion 55c of release plate 55. And, with stroke selector 59 positioned as in FIG. 2, release plate 55 engages bent portion 59b through cutout portion 55c when release plate 55 is moved through distance 1 during its downward movement. Bent portion 59b thus prevents movement of release plate 55 beyond distance 1. On the other hand, bent portion 59b may be moved away from the path of movement of cutout portion 55c when bent portion 59b is rotated clockwise by the stroke selector by means of pin 50a. A switch actuating lever 61 is biased by a spring 79 for clockwise rotation about its central pin, and a projection 61c comes into contact with a bent portion 55d of release plate 55. Lever 61 rotates counter-clockwise against the bias of spring 79 when release plate 55 is in its lifted position. At the same time, a pin 61a on lever 61 allows a switch $S_1$, comprised of contact pieces 62 and 63, to open by the resiliency of the contact pieces. However, pin 61a causes switches $S_1$ and $S_2$ to be closed in sequential order during clockwise rotation of lever 61. A lower end 61b at the bent arm of lever 61 is engageable with shoulder 59c of stroke selector 59 so that clockwise rotation of level 61 following the downward movement of release plate 55 can be restricted.

A shutter control mode selector 60 has a pin 60a thereon which comes into contact with cam 53 and, in accordance with the setting of the position of pin 60a depending on the relative rotation of cam 53, a shutter device 80 may be set to any one of the aforementioned shutter speed control modes.

Figure 3:
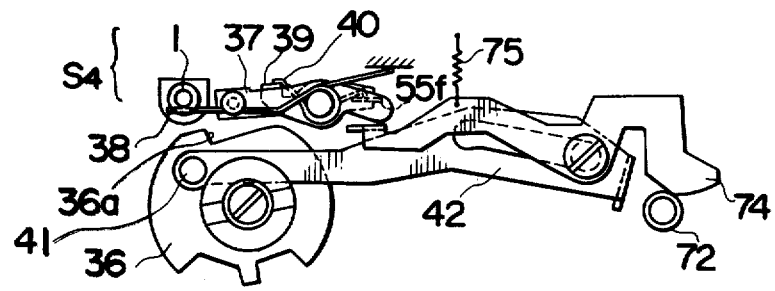
FIGS. 3 and 4 are bottom views of the film wind-up mechanism at the side of the drive unit, such mechanism being shown in a condition released from a film wind-up stop member in FIG. 3, and being shown, in a condition blocked by the film wind-up stop member in FIG. 4.
Figure 4:
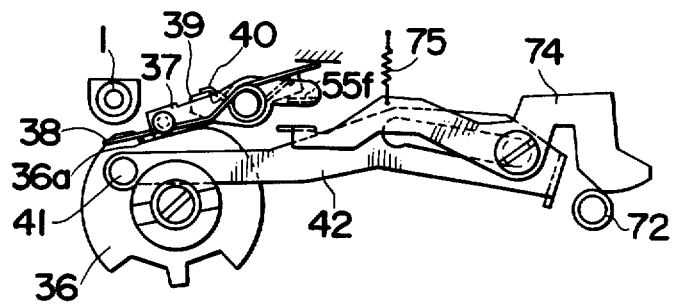

A wind-up stopping mechanism is shown in FIG. 3 as set for continuous photographing, and is shown in FIG. 4 as set for single frame photographing. A release lever 74 is mounted on the camera for pivotal movement about its center pin and is biased by a spring 75 for clockwise rotation. The release lever is rotated counter-clockwise against the bias of spring 75 as its one end is pushed by return lever 72 in response to the return of the mirror or the diaphragm drive lever 71. Stop lever 37, which is engageable with a bent portion provided at the other end of lever 74 and is connected by a spring 40 to auxiliary stop lever 39, is biased by a spring 38 for clockwise rotation and is engageable with cutout portion 36a of wind-up cam 36. When release plate 55 is depressed beyond distance 1 while stop lever 37 engages cutout portion 36a, release plate 55 comes into contact with auxiliary stop lever 39, as shown in FIG. 4, thus preventing clockwise rotation of the auxiliary stop lever. Linked to a pin 41 provided on cam 36 is a charge lever 42 which reciprocates in accordance with clockwise and counter-clockwise rotation of wind-up cam 36 and charges shutter device 80 during its forward (rightward) movement.

Figure 5:
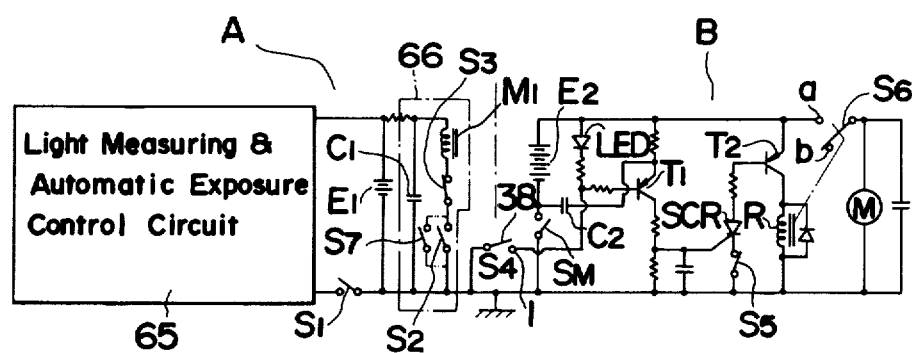
FIG. 5 is a circuit diagram of a shutter release circuit and a motor drive circuit of the drive unit of the first embodiment.

As shown in the FIG. 5 circuit diagram, a light measuring and automatic exposure control circuit 65 is connected through switch $S_1$, comprised of contact pieces 62 and 63, to a first power source $E_1$ on motor driven camera A. Control circuit 65 measures a scene brightness, indicates the results of a light measurement, and automatically controls an exposure based on the result of the light measurement by means of shutter device 80. Also, an electromagnetic release circuit 66 is connected to power source $E_1$ in parallel with circuit 65. Circuit 66 comprises a capacitor $C_1$ and a series connection including electromagnet $M_1$, switch $S_3$ closed by pin 35a of wind-up member 35 (FIG. 1), and switch $S_2$ comprising contact pieces 63 and 64, the series connection being in parallel with capacitor $C_1$. Further provided in the circuit on camera A is a switch $S_4$ comprising spring 38 by which stop lever 37 is biased, and positioning pin 1, spring 38 corresponding to a movable contact of switch $S_4$ in FIG. 5 and positioning pin 1 corresponding to a fixed contact of switch $S_4$ to be connected to a light emitting diode LED to be described later in more detail. It should be understood that, in lieu of spring 38 and positioning pin 1 being directly used as switch contact pieces, a switch to be closed by stop lever 37 when such lever is released may be provided, and at the same time positioning pin 1 or a portion thereof may be used as a connecting terminal, with a separate fixed contact member to be connected to the switch being provided at a position which comes into contact with positioning pin 1 on camera A in FIG. 3.

In drive unit B, a second power source $E_2$ and a main switch SM are interconnected in series. Light emitting diode LED, for indicating the wind-up operation, is electrically connected between second power source $E_2$ and positioning pin 1, and the light emitting diode LED lights up when switch $S_4$ is closed. The emitter of a transistor $T_1$, the base of which is connected through a resistor to the connection of light emitting diode LED and positioning pin 1, is connected through a capacitor $C_2$ to the negative polarity of second power source $E_2$ and is, at the same time, connected through a resistor to the positive polarity of second power source $E_2$. Connected to the collector of transistor $T_1$ is a voltage divider comprising two resistors, and the connecting point of the voltage divider is connected to the gate of a semi-conductor control element SCR. The catchode of semi-conductor control element SCR is grounded through a switch $S_5$, the opening and closing of which is controlled by switch actuating lever 10. The cathode of semi-conductor control element SCR is connected to the base of a transistor $T_2$ through a resistor. A relay coil R is connected to the collector of transistor $T_2$, the emitter of which is connected to second power source $E_2$. Connected through a relay switch $S_6$ having contacts a and b operated by relay coil R and through main switch SM to both ends of second power source $E_2$, are drive motor M and a capacitor connected in parallel with this drive motor.

In accordance with the aforedescribed embodiment, when drive unit B is mechanically coupled to motor drive camera A by suitable means (not shown) with positioning pin 1 fitted into positioning opening 31, the circuit on camera A and that on unit B are automatically interconnected.

When selector 50 is set to a continuous photographing position and dial 52 is set to an automatic control mode or to a manual control mode, whereby a shutter speed is electrically controlled, pin 53a of cam 53 and pin 50a of selector 50 do not abut against bent portion 59a. The stroke selector is thus caused to remain positioned in its counter-clockwise rotation shown in FIG. 2. At the same time, shutter control mode selector 60, on which pin 60a is fixed to abut against cam 53, is positioned at any one of the electrical shutter control modes. With the above condition, when shutter button 51 is depressed, release plate 55 is lowered via release shaft 54 and the movement of release plate 55 is stopped when it moves through a distance 1 until its cutout portion 55c abuts against bent portion 59b. Thus, lower end 55f of the release plate is not moved into contact with auxiliary stop lever 39.

During the downward movement of the release plate, bent portion 55d effects clockwise rotation of lever 61 under the force of spring 79 to first push the open contact pieces 62 and 63 into contact with one another so as to close switch $S_1$ whereby power is supplied to light measuring and automatic exposure control circuit 65. Further clockwise rotation of lever 61 pushes contact pieces 63 and 64 together so as to close switch $S_2$ provided in electromagnetic release circuit 66.

At this time, switch $S_3$ shown in FIG. 1, is closed since wind-up member 35 is at its initial position. This causes an electric charge stored in capacitor $C_1$ to be discharged through electromagnet $M_1$ at which a magnetomotive force occurs. This magnetomotive force decreases the magnetomotive force of a permanent magnet $M_2$, causing armature 67b, which had been attracted to the yoke of magnet $M_2$, to be released from the yoke and lever 67 to be rotated clockwise by spring 68, as shown in FIG. 2, whereby pin 67a rotates stop lever 69 counter-clockwise against the force of spring 20.

The mirror or diaphragm lever 71, which had been held in its solid outline position by jaw 69b, is thus released upon counter-clockwise rotation of stop lever 69, the mirror being moved to the photographing position at the same time a diaphragm is also being stopped down to a preset diaphragm aperture. In response to the completion of the mirror movement and diaphragm stopping-down by stop lever 71, the shutter is released from its stopped or charged position thus causing the leading shutter member to travel to open the shutter. At the same time, light measuring and automatic exposure control circuit 65 inverts the operation condition of an electromagnet (not shown) for stopping a trailing shutter member, as is well known, after an appropriate or desired lapse of time set by circuit 65 or by a shutter speed control circuit for manual speed setting from the traveling of the leading shutter member, the stop of the trailing shutter member thus being released to close the shutter. During the rightward movement in FIG. 2 (leftward movement in FIG. 3) of return member 72, the stop condition of which is released by a signal representative of the completion of the shutter closure, the mirror or diaphragm drive lever 71 is driven from its phantom outline position to its solid outline position so as to return the mirror to the image viewing position and the diaphragm to its fully open position, thereby causing lever 67 to rotate counter-clockwise against the force of spring 68 and causing armature 67b to abut against the yoke of electromagnet $M_1$. Return member 72 is also caused to push release lever 74 so as to rotate it counter-clockwise against the force of spring 75. As a result, auxiliary stop lever 39 and stop lever 37 rotate clockwise under the force of spring 38, thereby causing the tip of stop lever 37 to be moved away from cutout portion 36a of wind-up cam 36 whereupon switch $S_4$ is caused to be closed. In such a closing position of switch $S_4$, light emitting diode LED of FIG. 5 lights up and transistor $T_1$, which has been blocked, is made conductive thereby allowing a voltage to be applied to the gate of semi-conductor control element SCR. Since switch $S_5$ is closed at this time, semi-conductor control element SCR is made conductive and transistor $T_2$ is also turned on, thus causing relay coil R to be excited so as to change switch $S_6$ from contact b to contact a, by which power is supplied from second power source $E_2$ to drive motor M which then starts rotating its gear 9.

The rotating drive force of the drive motor is transmitted from coupling element 2 of drive unit B through gears 9 and 8, clutches 7 and 6, and gears 5, 4 and 3 in FIG. 1 to coupling element 32 of motor driven camera A for effecting film wind-up and shutter charge operations.

At such time, wind-up cam 36 is rotated clockwise from its position of FIG. 3 thus causing charge lever 42 to slide to the right. Charge lever 42 then charges shutter device 80 and pushes return member 72 to the right so that the mirror or diaphragm presetting system is charged for a return force. At the same time, wind-up cam 36 rotates a film wind-up system (not shown) by means of a one-way clutch (also not shown) for winding up one frame of film.

Upon completion of one film frame wind-up and shutter charge action, the rotation of wind-up cam 36 on camera A is stopped by a film measuring mechanism and a shutter charging mechanism in any normal manner. This causes the rotation of coupling element 2, connected to coupling element 32, to stop. However, at this time, drive motor M remains driven, thereby giving an overload to roller 7b, thus causing roller holder 7a to rotate counter-clockwise against the force of spring 7c, and roller 7b to be disengaged from cutout portion 6a. This permits drive cam 6 and coupling element 2 connected thereto, as well as coupling element 32, wind-up cam 36 and charge lever 42 to be returned together to their initial positions by springs 12 and 43, respectively. After the disengagement of roller 7b from cutout portion 6a, roller support plate 7 on which roller 7a is pivotally mounted is further rotated by drive motor M via gears 8 and 9, pin 8a of gear 8 rotating switch actuating lever 10 clockwise against the force of spring 10 to open switch $S_5$ thereby blocking the conduction of semi-conductor control element SCR. This causes transistor $T_2$ to be blocked, thereby deenergizing relay coil R, by which switch $S_6$ is changed from contact a to contact b to block the power supply to the drive motor the rotation of which is then stopped. After pin 8a has moved switch actuating lever 10 out of its rotation path, the engagement between its pin 8a and switching actuating lever 10 is released, and switch actuating lever 10 recloses switch $S_5$ by the force of spring 11. At this time, however, wind-up cam 36 has already been returned to its initial position as described above, and return member 72 has been moved to the right by charge operation to the position where the depression of release lever 72 against stop lever 37 is released, thus causing stop lever 37 to be positioned in the rotation path of cutout portion 36a during the charging operation of wind-up cam 36. Therefore, switch $S_4$ is open, allowing semi-conductor control element SCR to remain non-conductive. It should be pointed out that even when switch $S_4$ is open while switch $S_5$ is closed, semi-conductor control element SCR, once made conductive, continues to be conductive because it is of a self-holding type and it is blocked only when switch $S_5$ is open.

While switch $S_3$ is open during the wind-up and shutter charge operation, capacitor $C_1$ is recharged. For continuous photographing, shutter button 51 remains depressed so that switch $S_2$ is maintained closed. When switch $S_3$ is closed by pin 35a, by reason of the return of wind-up cam 36 and wind-up member 35 to their initial positions, the electric charge at capacitor $C_1$ is immediately discharged through electromagnet $M_1$ is then re-excited.

Upon excitation of electromagnet $M_1$, the attraction of armature 67b to permanent magnet $M_2$ is released thus allowing electromagnetic release lever 67 to rotate clockwise by the force of its spring 68 thereby causing stop lever 69 to rotate counter-clockwise against the force of its spring 70. The mirror or diaphragm drive member 71, which had been maintained in its solid outline position, is thus released whereupon the photographing operations are repeated for continuous photographing.

Since switch $S_2$ is opened when the depression of shutter button 51 is released, no discharge of capacitor $C_1$ is instantly made so that no current flows through electromagnet $M_1$ even after switch $S_3$ has been closed, as described earlier, upon completion of the wind-up member operation. Thus, no shutter release operation is permitted at this time.

Selector 50 may comprise a rotatable ring having its pin 50a disposed thereon in such a manner that, when the selector is set in its single frame photographing mode, pin 50a contacts bent portion 59a of the stroke selector for rotating same clockwise against the force of its spring 77. Bent portion 59b is therefore moved away from cutout portion 55c while at the same time positioning shoulder 59c of the stroke selector is moved into the rotational path of lower end 61b of switch actuating lever 61. Thus, upon downward movement of release plate 55, lever 61 is rotated a limited amount via 55d and 61c until its end 61b contacts shoulder 59c to thereby effect a closing of only switch $S_1$ as pieces 62 and 63 are brought into contact with one another by means of pin 61a. As shown in FIG. 2 the rotational extent of lever 61 is such as to permit only contact between pieces 62 and 63, and to permit disablement of the closure of switch $S_2$ since pieces 63 and 64 thus remain out of contact with one another. Electromagnetic release circuit 66 therefore remains inoperative. Following this release operation, release plate 55 may be lowered beyond the limitation of distance l to thereby rotate mechanical release lever 78 clockwise to a large extent whereupon the release lever engages extension 69c for rotating stop lever 69 counter-clockwise to thus release the mirror or diaphragm drive member 71 which was held by the stop lever in its solid outline position. And, during the unrestrained lowering of plate 55, end piece 55f thereof engages behind auxiliary stop lever 39, as shown in FIG. 4, for preventing the clockwise return rotation thereof to its position of FIG. 3.

With shutter button 51 thus depressed to release the shutter for a photographing operation, the mirror is returned to its image viewing position and the diaphragm is returned to its fully open position by the action of return member 72 in response to the shutter closing signal. At the same time, the return member abuts against stop release member 74, as shown in FIG. 4, for rotating same counter-clockwise about its pivotal connection against the force of spring 75, thus separating stop lever 37 from lever 74. As described earlier, however, end piece 55f is positioned to stop the clockwise rotation of lever 39, which thus stops the clockwise rotation of lever 37 under the force of its spring 38. It can therefore be seen that the stop release of wind-up cam 36 by stop lever 37 and the operation for closing switch $S_4$ do not occur even when photographing has been completed and stop release lever 74 is operated and, while shutter button 51 remains depressed, switch $S_4$ is maintained open so that drive motor M does not again rotate. When the depression of shutter button 51 is released, auxiliary stop lever 39 is capable of rotating clockwise from its position shown in FIG. 4, and stop lever 37 also rotates clockwise away from cutout portion 36a. At the same time switch $S_4$ closes thus operating a drive circuit, as described above, for the film wind-up and charge shutter operation carried out by drive motor M. Accordingly, only single frame photographing is carried out by a single release operation.

It should be understood that when shutter speed setting dial 52 is set at a mechanical control mode, pin 53a is so positioned as to move stroke selector 59 clockwise, similar to single frame photographing, for change over to the mechanical release condition, and pin 60a is moved by the outer periphery of cam 53 to cause selector 60 to set shutter device 80 to the mechanical shutter control mode.

In the aforedescribed embodiment, the electromagnetic release system is changed over to the mechanical release system when single frame photographing is set. However, mechanical release lever 78 may be omitted and the electromagnetic release operation may be made possible whereupon switch actuating lever 61 and stroke selector 59 do not abut one another even when single frame photographing is set. Alternatively, the arrangement may be such that while lever 78 is eliminated with no other changes made from the aforedescribed embodiment, switch actuating lever 61 is stopped by stroke selector 59 during its single frame photographing, and a switch $S_7$ will then be closed by the lowering of release plate 55 beyond the limited stroke distance l. Switch $S_7$ is arranged in the circuit diagram parallel to switch $S_2$ so that electromagnetic release is carried out by the closing of switch $S_7$.

Figure 6:
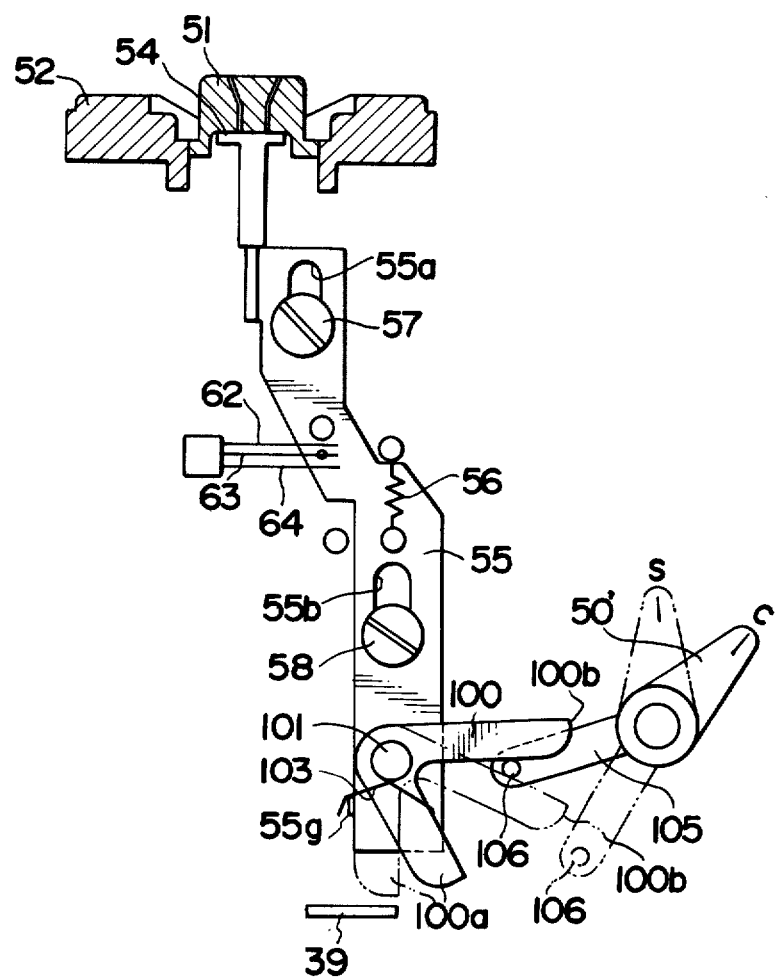
FIG. 6 is a front elevational view of a shutter release mechanism and a photographing modes selecting mechanism of the camera according to a second embodiment of the present invention.

In another embodiment of the invention shown in FIG. 6, wherein the release stroke of release plate 55 remains unchanged, a single frame photographing and continuous photographing selector 50' is provided on motor driven camera A and may be set to either a single frame photographing position S or to continuous photographing position C. A member 100 is provided for engagement with auxiliary stop lever 39 only when selector 50' is set to position S.

Selector 50' is pivotally mounted on a front wall (not shown) of camera A for external manipulation, and a pin 106 is mounted on a surface of an operating member 105 extending radially outwardly of selector 50' inside the front wall of camera A. Stop member 100 is pivotally mounted on a shaft 101 located on release plate 55 and is biased by means of a spring 103 for clockwise rotation. An arm 100b of the stop member is engageable with pin 106. When selector 50' is set at continuous photographing position C, operating member 105 rotates stop member 100 counter-clockwise against the force of its spring 103 via pin 106 thereby moving the other arm 100a of the stop member to a position away from auxiliary stop lever 39 (shown in solid outline), so as not to abut lever 39 even when plate 55 is moved downwardly upon depression of shutter button 51. When selector 50' is set at its single frame photographing position S, pin 106 is moved away from arm 100b thereby allowing stop member 100 to rotate clockwise by the force of its spring 100 until its arm 100a bears against a stop element 55g disposed on plate 55. Thus, arm 100a is disposed in its position shown in phantom outline above lever 39 so as to be brought into contact with lever 39 upon the lowering of plate 55. And, as in the aforedescribed embodiment, switch $S_4$ is controlled by stop lever 37 connected to lever 39.

It should be noted that, in lieu of stop member 100 being pivotally mounted on plate 55, a stop member may be interlocked with selector 50' for downward movement with plate 55 when a single frame photographing is set, may be provided so that such stop member is moved downwardly by the release plate for stopping auxiliary stop lever 39 upon the downward travel of the release plate. However, when selector 50' is set at continuous photographing position C, such stop member should be moved away from the lowered path of release plate 55.

Figure 7:
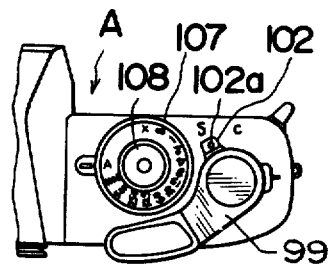
FIG. 7 is a top view of a camera according to its third embodiment of the invention.
Figure 8:
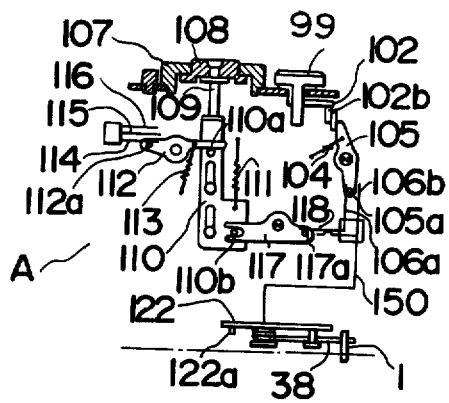
FIG. 8 is a schematic front elevational view of a shutter release mechanism and a photographing modes selecting mechanism of the camera of the third embodiment.

FIGS. 7 to 10 illustrate another embodiment according to the invention wherein like parts described earlier are identified by like reference numerals. A rotatable mode selector 102 is shown in FIG. 7 as being loosely mounted on the rotatable shaft of a wind-up lever 99 disposed on the top surface of camera A so that the setting of indicator 102a at index S or at index C can be visibly seen. As shown in FIG. 8, a change over contact member 105 is located inwardly of the camera and is biased into counter-clockwise movement by a spring 104 against a pin 102b projecting from selector 102. Also provided are contact pieces 106a and 106b which are opened and closed by a pin 105a mounted at one end of member 105.

A release plate 110, more clearly shown in FIG. 13, is mounted on the camera for vertical axial movement by means of pins extending through elongated slots similar to that provided for plate 55, i.e., pins 57 and 58 extending through slots 55a and 55b. Plate 110 is biased upwardly by a spring 111 normally into abutment with a release coupling element 109 connected to a release button 108. Pins 110a and 110b are mounted near opposite ends of release plate 110, and switch actuating member 112 is mounted on the camera and is biased into clockwise movement by a spring 113 so that an arm of member 112 abuts against pin 110a. A pin 112a, mounted on another arm of member 112, engages a contact piece 114 upon clockwise rotation of member 112. Contact piece 114 and a normally open contact piece 115 comprise a switch $S'_1$ located in the electric circuit as diagrammed in FIG. 10. Also, a normally open contact piece 116 is disposed parallel to and adjacent piece 115, pieces 115 and 116 together comprising a switch $S'_2$ which is disposed in the circuit as diagrammed in FIG. 10.

A fork member 117 is pivotally mounted on the camera and has a forked end in engagement with pin 110b. A pin 117a on this member engages a contact piece 118 which constitutes, together with an adjacent contact (unreferenced), a switch $S_9$ shown in FIG. 10. Fork member 117 is rotated counter-clockwise when release plate 110 moves downwardly thereby causing contact piece 118 to be moved by pin 117a thus to open switch $S_9$. Contact pieces 106a, 106b and pin 105a together comprise a change over switch $S_8$ (FIG. 10), connection between pin 105a and contact piece 106a indicating that switch $S_8$ is changed over to contact d while connection between pin 105a and contact piece 106b indicates that switch $S_8$ is changed over to contact e.

Figure 9:
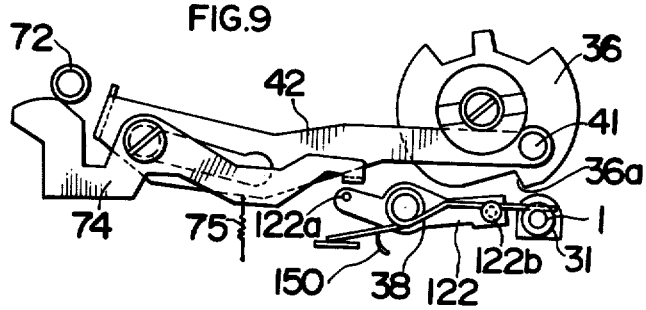
FIG. 9 is a bottom view of a film wind-up mechanism of the camera of the third embodiment.

A film wind-up stopping mechanism mounted within camera A is shown in FIG. 9 as including a stop lever 122 which replaces stop lever 37 and auxiliary stop lever 39 of FIGS. 3 and 4. The stop lever is biased into clockwise rotation by spring 38 so that, when return member 72 is moved to the right in response to the shutter closing signal, it abuts against one end of stop release lever 74 so as to rotate the same counter-clockwise whereupon the other end of lever 74 disengages from a pin 122a provided on one end of stop lever 122. Such disengagement permits stop lever 122 to rotate clockwise by the force of spring 38 thereby causing the other end of the lever and a stopper 122b thereon to be moved away from cutout portion 36a of wind-up cam 36. At the same time, spring 38, which constitutes switch $S_4$ together with positioning pin 1, is closed as spring 38 engages pin 1. When return member 72 is moved to the left away from the adjacent end of release lever 74, this lever is rotated clockwise by the force of spring 75 and the other end thereof engages pin 122a so that stop lever 122 is rotated counter-clockwise into engagement with cutout portion 36a, and spring 38 disengages from positioning pin 1 so as to open switch $S_4$.

Figure 10:
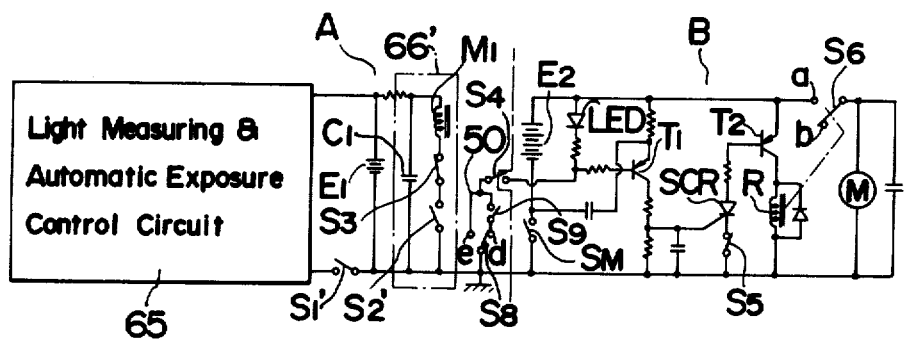
FIG. 10 is a circuit diagram of a shutter release circuit and a motor drive circuit of the drive unit of the third embodiment.

In accordance with the aforedescribed embodiment, when mode selector 102 is manipulated so as to set its indicator 102a to the single frame photographing position S (FIG. 7), pin 102b is so disposed as to rotate change over contact member 105 clockwise against the force of spring 104 thereby causing pin 105a to abut against contact piece 106a. This causes change over switch $S_8$ to become connected with contact d (FIG. 10). When switch $S_8$ is so connected, and shutter button 108, which is disposed centrally of shutter speed setting dial 107, is depressed, release plate 110 is moved downwardly by release coupling member 109 against the force of spring 111 thereby connecting, at the initial stage of such downward movement, contact pieces 114 and 115 by means of switch actuating member 112. Since this closes switch $S'_1$ shown in FIG. 10, light measuring and automatic exposure control circuit 65 is connected to first power source $E_1$ mounted within the camera, and an appropriate shutter speed control by light measuring and automatic exposure control circuit 65 for scene brightness, film sensitivity set and diaphragm aperture value is indicated in the view finder (not shown) as in any normal manner. At the same time, at the initial stage of the downward movement of release plate 110, fork member 117 is rotated counter-clockwise by pin 110b thereby causing pin 117a to open switch $S_9$. During further downward movement of release plate 110, switch actuating member 112 is further rotated clockwise to effect connection between contact pieces 115 and 116. This causes switch $S'_2$ shown in FIG. 10, to be closed, and capacitor $C_1$ of an electromagnetic release circuit 66' is discharged so that a current flows through the coil of electromagnet $M_1$ for electromagnetic release operation. The magnetomotive force of a permanent magnet (not shown but corresponding to $M_2$ of FIG. 2) is thereby caused to be reduced by the magnetomotive force of electromagnet $M_1$, thus releasing a movable mirror or diaphragm maintained in its image viewing position or fully open position, so that the diaphragm is stopped-down to a preset aperture value, and at the same time the movable mirror moves away from the photographing light path so as to be positioned for photographing. As is well known, at such time, a memory switch within light measuring and automatic exposure control circuit 65 is opened, and a signal containing information on a scene brightness in the fully opened diaphragm aperture is stored in light measuring and automatic exposure control circuit 65. Upon completion of the movable mirror and diaphragm operations, a leading shutter member is released from its stopped position and the shutter is opened. After a predetermined time (in seconds) corresponding to the signal containing information on the scene brightness or corresponding to a preset shutter speed, a trailing shutter member is released from its stopped position and is allowed to travel so that the shutter is closed. Return member 72 travels in response to a signal representative of the completion of the trailing shutter members travel, and the movable mirror is returned by the travel of return member 72 to the photographing light path so that the diaphragm is at a fully opened condition. At the same time, return member 72 abuts against stop release lever 74, as shown in FIG. 9, by rotating lever 74 counter-clockwise against the force of spring 75 and thereby unlocking stop lever 122 by means of stop release lever 74 so as to allow stop lever 122 to rotate clockwise by the force of spring 38 thereby moving stopper 122b away from the rotating path of cutout portion 36a. Further, spring 38 engages with a positioning opening in pin 1 thereby closing switch $S_4$ of FIG. 10. However, when switch $S_4$ is closed, switch $S_8$ is changed to contact d for single frame photographing, as described earlier. And, switch $S_9$ is opened by fork member 117 as shutter button 108 remains depressed, as mentioned earlier, thus causing transistor $T_1$ to be maintained non-conductive and semi-conductor control element SCR to also be non-conductive, whereby transistor $T_2$ remains turned off thereby permitting no current to flow through relay coil R which maintains switch $S_6$ to be on contact b whereby no power is supplied to drive motor M. No wind-up and shutter charge operation is therefore carried out. When finger pressure is removed from shutter button 108, release plate 110 is permitted to move upwardly under the force of its spring 111 thereby causing pin 117a to be moved away from contact piece 118 to thereby close switch $S_9$. At this time, change over switch $S_8$ is connected to contact d and switch $S_4$ is closed, whereby transistor $T_1$, semi-conductor control element SCR and transistor $T_2$ all remain conductive thereby allowing current to flow through relay coil R and allowing switch $S_6$ to be connected to contact a. Current from second power source $E_2$ is therefore supplied to drive motor M for actuating same. While the film wind-up operation is carried out upon actuation of drive motor M, wind-up cam 36 rotates clockwise in FIG. 9 thereby causing return lever 72 to be moved to the left so that a movable mirror and diaphragm actuating mechanism and the shutter are charged through charge lever 42. It should be noted that return member 72, when moved leftward, is at a spaced distance from stop release lever 74.

When the wind-up and shutter charge action for one frame of film is completed, switch $S_5$ is opened in a similar manner described for the earlier embodiment, and semi-conductor control element SCR is blocked while relay coil R is deenergized, whereby switch $S_6$ is changed over to contact b so that the power supply to drive motor M is cut off thereby stopping the motor. Further, while disc 35 and wind-up cam 36 are returned to their initial positions, as described earlier, and while switch $S_3$ is closed, stop lever 122 is rotated counter-clockwise by the force of spring 75 whereupon lever 122 engages cutout portion 36a of wind-up cam 36 which is returned to its initial position whereupon the film wind-up and shutter charge action is stopped. It is to be understood that switch $S_4$ is opened when stop lever 112 is rotated counter-clockwise into abutting engagement with cutout portion 36a. Thus, when finger pressure is released from shutter button 108, the automatic film wind-up and shutter charge action is completed for single frame photographing.

For continuous photographing, stop member 102 is moved so as to set its indicator 102a to index C, pin 102b thereof being so disposed as to permit member 105 to rotate counter-clockwise under the force of its spring 104. Thus, upon such rotation, pin 105a abuts against contact piece 106b. This indicates that switch $S_8$ is connected to contact e in FIG. 10. Therefore, since the terminal at the left end of switch $S_4$ is connected to the ground wire without connection with switch $S_9$, power is supplied by the closure of switch $S_4$ to drive motor M, regardless of the opening and closing of switch $S_9$, and a film wind-up and shutter charge action commences, as mentioned earlier.

When switch $S_4$ is closed by the contact between spring 38 and pin 1 as stopper 122b moves away from cutout portion 36a by means of stop release lever 74 subsequent to the rightward movement of return member 72 to the position shown in FIG. 9 in response to a signal representative of the completion of the shutter closure, transistor $T_1$ and semi-conductor conductor control elemental SCR and transistor $T_2$ are all made conductive, thereby allowing relay R to be excited by the power supplied to drive motor M. When shutter button 108 remains depressed, switch $S'_2$ is maintained closed, thus causing capacitor $C_1$ of electromagnetic release circuit 66' to be discharged when switch $S_3$ is closed by the return of disc 35 to its initial position after completion of the shutter charge action, whereupon the shutter is thus released. When switch $S_4$ is closed after the shutter has been closed, as described earlier, power is again supplied to drive motor M for continuous photographing. When finger pressure is removed from shutter button 108 under this condition, switch $S'_2$ is opened thereby causing capacitor $C_1$ of circuit 66' to remain undischarged even when switch $S_3$ is closed by the return of disc 35 to its initial position upon completion of the shutter charge action, so that no release operation is effected to terminate continuous photographing.

It should be noted that any portion of spring 38 other than that coming into contact with pin 1, and connected to a circuit wire 150 (see FIG. 9), is covered with an insulating film or membrane for preventing spring 38 from being grounded to the camera body. On the other hand, pin 105a of change over contact member 105 is grounded to the camera body.

In the aforedescribed embodiment, single frame photographing and continuous photographing are electrically changed over, and there are no special restrictions as to the arrangement of the change over switch. A variety of modifications is therefore available for this embodiment.

Figure 11:
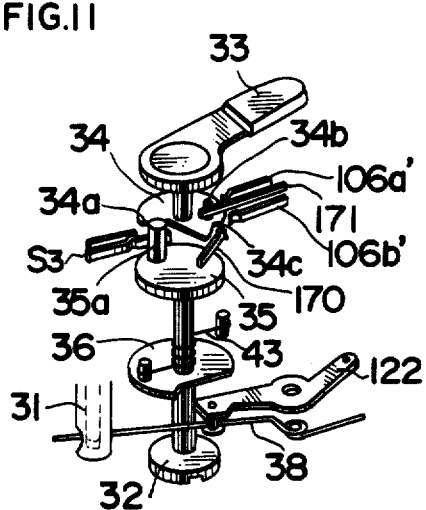
FIG. 11 is a perspective of a film wind-up mechanism and a photographing modes selecting mechanism of a camera according to a fourth embodiment of the invention.
Figure 12A:
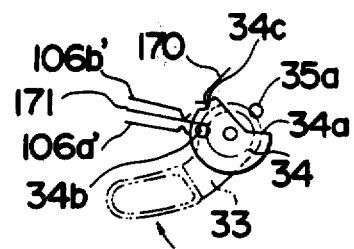
FIGS. 12a and 12b are plan views of switches associated with the film wind-up mechanism and the photographing modes selecting mechanism shown in FIG. 11, respectively illustrating the switches in different operational modes.
Figure 12B:
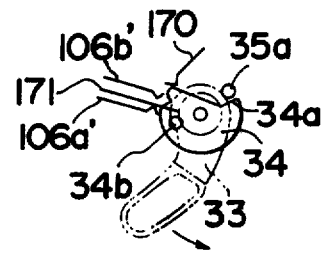

For example, as shown in FIGS. 11 and 12, single frame photographing and continuous photographing are changed over by utilizing the angle between the position at which windup lever 33 is housed in place (phantom outline in FIG. 12a) and its initial position (phantom outline in FIG. 12b) for film wind-up. A click spring 170 is provided on camera A, and a cutout portion 34c of cam 34 is engageable with the click spring. As shown in FIG. 12a at the housing position of wind-up lever 33, a contact piece 171 is moved by a pin 34b on cam 34 into contact with a contact 106b', whereby continuous photographing is made possible. At the initial position of the wind-up lever (FIG. 12b), pin 34b moves contact piece 171 into contact with a contact 106a' whereby a single frame photographing is made possible. Therefore, pin 34b and contact piece 171 function similarly to that of pin 105a of FIG. 8, and contact piece 171 and contacts 106a' and 106b' together comprise switch $S_8$ shown in FIG. 10.

In the FIG. 13 embodiment, a selector 202 having a handle 202a is mounted on the camera co-axial with shutter speed setting dial 107, and a projection 202b on the selector causes, upon selector rotation, to move change over contact 105 to place its pin 105a into contact with either contact piece 106a or 106b for the change over of single frame and continuous photographing. Otherwise, the FIG. 13 embodiment is the same as that described in the embodiment of FIGS. 7 to 10.

In the FIG. 14 embodiment, single frame photographing and continuous photographing are changed over by the depth of a stroke when the release button is depressed for release operation. A click plate 175 is provided on the camera to click-stop the lowering of release plate 110, and single frame photographing is effected at the position where lowering of release plate 110 is stopped by click plate 175, whereupon contact piece 118 is caused to move to its neutral position out of contact with either contact piece 106d or 106e. When contact piece 118 is again connected to contact 106e by the return of shutter button 108 to the initial position, a film wind-up and shutter charge action is started. When the shutter button is maintained depressed beyond the position at which release plate 110 is click-stopped by the click plate, contact piece 118 remains in contact with contact 106d for allowing continuous photographing to be carried out.

It should be noted that contact piece 118 and contacts 106d, 106e comprise a change over switch $S_{10}$ corresponding to switches $S_8$ and $S_9$ shown in FIG. 10.

Figure 15:
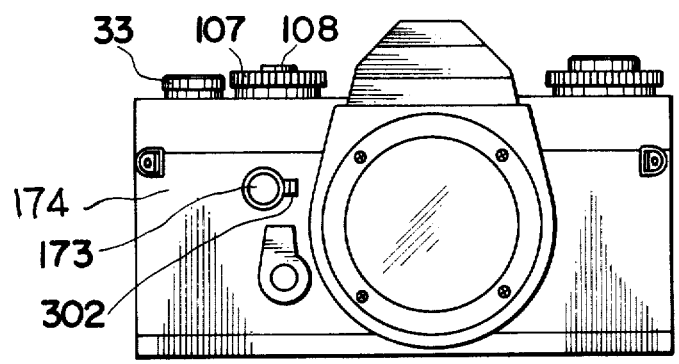
FIG. 15 is a front elevational view of a camera according to a seventh embodiment of the invention.
Figure 16:
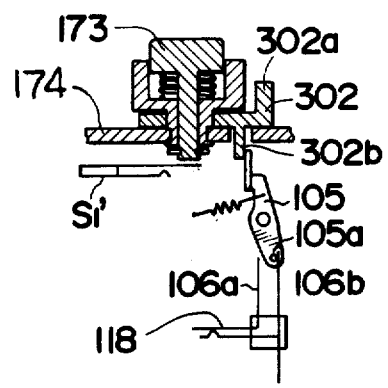
FIG. 16 is a front elevational view, partly in section, of a photographing modes selecting mechanism of the camera shown in FIG. 15.

FIGS. 15 and 16 illustrate a further embodiment in which a button 173 is provided for closing switch $S'_1$ for actuating circuit 65, and is positioned on a front wall 174 of the camera so that the button may be easily depressed while holding the camera in a normal manner. Thus, change over of single frame and continuous photographing is easily facilitated. Also, a change over member 302 having a handle 302a, is disposed co-axially with the shaft of button 173, as shown in FIG. 16 illustrating in cross-section the actuating mode of change over member 302. The constructions of switch $S_8$, consisting of change over contact member 105, contact pieces 106a and 106b, and switch $S_9$, consisting of contact piece 118, are similar to that shown in FIG. 8.

Figure 17:
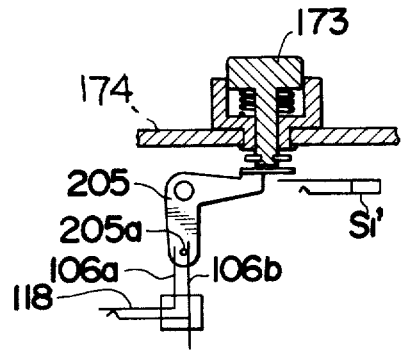
FIG. 17 is a front elevational view, partly in section, of a photographing modes selecting mechanism of a camera according to an eighth embodiment of the invention.

In the FIG. 17 embodiment, a change over member 205 is rotated clockwise upon the depression of button 173, thereby causing pin 205a thereon to contact contact piece 106a for a single frame photographing and thereby closing switch $S'_1$. On the other hand, when button 173 returns to its initial position, thereby permitting change over member 205 to rotate counterclockwise by the force of its spring (not shown), pin 205a contacts contact piece 106b for continuous photographing. At that time switch $S'_1$ is closed such that the result of a light measurement is checked while focussing on an object to be photographed, and single frame photographing is made possible. Therefore, the photographer may change over single frame or continuous photographing easily without operating a change over member which might be provided separately from button 173.

Obviously, many other modifications and variations of the present invention are made possible in the light of the above teachings. It is therefore to be understood that within the scope of the appended claims the invention may be practiced otherwise than as specifically described.

We claim:

1. A motor driven camera having a detachable drive unit including a motor, a motor drive electrical circuit for driving said motor and interconnecting means connected to said motor, the camera comprising:
   a shutter;
   a manual release member movably mounted on said camera;
   a shutter release means engageable by said release member for releasing said shutter upon movement of said release member;
   a film wind-up and shutter charge mechanism connected with said motor via said interconnecting means to be operated by said motor with said drive unit being attached to said camera, said shutter charge mechanism including a reciprocable member capable of reciprocating between an initial position and an operative position at which a film wind-up and a shutter charge is completed;
   means for disconnecting said interconnecting means from said motor when said reciprocable member reaches said operative position;
   means for biasing said reciprocable member to said initial position so that said reciprocable member is returned to said initial position due to the disconnection of said interconnecting means from said motor;
   means for generating an electrical signal for actuating said motor drive circuit upon termination of an exposure;
   a manual selector mounted on said camera for movement between a single frame photographing position and a continuous photographing position; and
   a control mechanism engageable with said selector and said manual release member for deactivating said signal generating means to prevent the generation of said signal when said manual release member is kept at the moved position with said selector being set at said single frame photographing position.

2. The motor driven camera according to claim 1, further comprising:
   a film wind-up stop mechanism for retaining said reciprocable member at said initial position after the completion of a film wind-up and a shutter charge; and means for disabling said film wind-up stop mechanism upon termination of an exposure, and wherein said control mechanism is engageable with said film wind-up stop mechanism such that said film wind-up mechanism continues to retain said reciprocable member at said initial position even after the actuation of said disabling means when said manual release member is kept at the moved position with said selector being set at said single frame photographing position, and said generating means includes a switch member engageable with said film wind-up stop mechanism for generating said signal when said film wind-up stop mechanism is disabled to release said reciprocable member.

3. The motor driven camera according to claim 2, wherein said shutter release means includes a normally biased movable member movable upon predetermined movement of said manual release member against its normal bias, and said control mechanism includes a stroke restricting member which is responsive to said selector for restricting movement of said movable member when said selector is set at said continuous photographing position and for allowing said movable member to move unrestricted when said selector is set at said single frame photographing position, said movable member and said film wind-up mechanism being arranged such that said film wind-up stop mechanism is engaged by said movable member to continue to retain said reciprocable member at its initial position even after the actuation of said disabling means when said movable member is moved unrestricted.

4. The motor driven camera according to claim 3, wherein said shutter release means further includes a switch actuating member movable with said movable member upon the predetermined movement of said manual release member, a switch actuated by said switch actuating member when said movable member is restrictedly moved, electromagnetic release means for releasing said shutter, and a release circuit operatively connected to said electromagnetic release means for actuation thereof in response to the actuation of said switch.

5. The motor driven camera according to claim 4, wherein said shutter release means further includes mechanical release means engageable with said movable member for releasing said shutter in response to the unrestricted movement of said movable member.

6. The motor driven camera according to claim 5, further comprising means for preventing actuation of said switch actuating member to deactivate said release circuit.

7. The motor driven camera according to claim 6, wherein said selector is disposed co-axially with said manual release member.

8. The motor driven camera according to claim 2, wherein said shutter release means includes a normally biased movable member movable upon predetermined movement of said manual release member against its normal bias, and said control mechanism includes means provided on said movable member and engageable with said selector for making said film wind-up mechanism continue to retain said reciprocable member at its initial position even after the actuation of said disabling means when said movable member is at a position moved by the predetermined movement and said selector is set at the single frame photographing position.

9. The motor driven camera according to claim 8, wherein said shutter release means further includes a switch actuated in response to the movement of said movable member, electromagnetic release means for releasing said shutter and a release circuit operatively connected to said electromagnetic release means for actuation thereof in response to the actuation of said switch.

10. The motor driven camera according to claim 9, further comprising a camera body having a front wall, and wherein said selector is provided on said front wall.

11. The motor driven camera according to claim 1, wherein said shutter release means includes a normally biased movable member movable upon predetermined movement of said manual release member against its normal bias, and said control mechanism includes a first switch operatively coupled with said selector for being switched into first and second positions upon respective movement of said selector to said single frame photographing position and to said continuous photographing position, and a second switch operatively coupled with said movable member for being changed over from its first position to its second position upon the movement of said movable member, said signal generating means being connected to said first and second switches so as to be activated when said first switch is at its second position independently of the position of said second switch and so as to be deactivated when said first switch is at its first position and said second switch is at its second position.

12. The motor driven camera according to claim 11, further comprising a manual film wind-up lever operatively coupled with said film wind-up and shutter charge mechanism, and wherein said selector is disposed co-axially with said film wind-up and shutter charge member.

13. The motor driven camera according to claim 11, further comprising a manual film wind-up lever operatively coupled with said film wind-up and shutter charge mechanism and being mounted on said camera for movement from a housed position to a film wind-up initiating position without operating said film wind-up and shutter charge mechanism, and wherein said film wind-up lever is defined by said selector such that said housed position of said film wind-up lever is said continuous photographing position of said selector whereas said film wind-up initiating position of said film wind-up lever is said single frame photographing position of said selector.

14. The motor driven camera according to claim 11, wherein said selector is disposed co-axially with said manual release member.

15. The motor driven camera according to claim 14, further comprising a shutter speed setting member disposed co-axially with said manual release member and said selector.

16. The motor driven camera according to claim 11, further comprising a scene brightness measuring and indicating device, and a manual member for actuating said scene brightness measuring and indicating device, and wherein said selector is disposed co-axially with said manual member.

17. The motor driven camera according to claim 11, further comprising a scene brightness measuring and indicating device and a manual member movable from a non-operated position to an operated position for actuating said scene brightness measuring and indicating device, and wherein said manual member constitutes said selector such that said operated position of said manual member defines said single frame photographing position of said selector, whereas said non-operated position of said manual member defines said continuous photographing position of said selector.

18. The motor driven camera according to claim 11, wherein the connection between said signal generating means and said first and second switches is such that said signal generating means is activated also when said first and second switches are at their first positions.

19. The motor driven camera according to claim 1, wherein said shutter release means includes a normally biased movable member movable upon predetermined movement of said manual release member against its normal bias, wherein said manual release member and said movable member constitute said selector such that a first position of said movable member moved by a predetermined stroke defines said single frame photographing position of said selector whereas a second position of said movable member moved by a stroke greater than said predetermined stroke defines said continuous photographing position of said selector, and wherein said control mechanism includes a changeover switch operatively coupled with said movable member to be switched from a first position to a second position upon movement of said movable member to its first position and further to a third position upon movement of said movable member to its second position, said signal generating means being connected to said change-over switch so as to be activated when said changeover switch is at its first and third positions and so as to be deactivated when said change-over switch is at its second position.

* * * * *